(12) United States Patent
Czerski et al.

(10) Patent No.: US 12,345,866 B2
(45) Date of Patent: Jul. 1, 2025

(54) SYSTEMS AND METHODS OF SINGLE-SHOT SPATIAL FREQUENCY MODULATION IMAGING

(71) Applicant: Colorado School of Mines, Golden, CO (US)

(72) Inventors: John Czerski, Denver, CO (US); Daniel Adams, Westminster, CO (US); Jeff Squier, Golden, CO (US)

(73) Assignee: Colorado School of Mines, Golden, CO (US)

( * ) Notice: Subject to any disclaimer, the term of this patent is extended or adjusted under 35 U.S.C. 154(b) by 429 days.

(21) Appl. No.: 17/868,562

(22) Filed: Jul. 19, 2022

(65) Prior Publication Data

US 2023/0022903 A1 Jan. 26, 2023

Related U.S. Application Data

(60) Provisional application No. 63/224,158, filed on Jul. 21, 2021.

(51) Int. Cl.
*G02B 21/00* (2006.01)
*G02B 21/06* (2006.01)
*G02B 21/36* (2006.01)

(52) U.S. Cl.
CPC ......... *G02B 21/0064* (2013.01); *G02B 21/06* (2013.01); *G02B 21/364* (2013.01)

(58) Field of Classification Search
CPC .. G02B 21/0064; G02B 21/06; G02B 21/364; G02B 21/00; G02B 21/0004; G02B 21/002; G02B 21/0032; G02B 21/0052; G02B 21/0076; G02B 21/36; G02B 21/361; G01J 3/00; G01J 3/02; G01J 3/0205; G01J 3/0229; G01J 3/10; G01J 3/18; G01J 3/28; G01J 3/2823; G01J 2003/2826

USPC ............... 359/363, 362, 368, 369, 385, 389; 356/300, 302, 303, 305, 310, 319, 320, 356/323, 325, 326, 328

See application file for complete search history.

(56) References Cited

U.S. PATENT DOCUMENTS 4,786,124 A * 11/1988 Stone ..................... G02B 26/00
359/15
7,301,625 B2 * 11/2007 Brady ................... G01J 3/0218
356/330

FOREIGN PATENT DOCUMENTS

JP 2011090261 A * 5/2011
WO WO-2016087393 A1 * 6/2016 ............. G02B 21/14

* cited by examiner

*Primary Examiner* — Arnel C Lavarias
(74) *Attorney, Agent, or Firm* — Sheridan Ross PC

(57) ABSTRACT

Systems and methods of imaging are described. An imaging system includes a light source configured to projecting a beam of light; a first diffraction grating configured to separating wavelengths of the projected beam of light; a first lens configured to focusing the wavelengths of the projected beam of light projecting from separated by the first diffraction grating; a reticle configured to altering each wavelength of light focused by the first lens; a second lens configured to collimating the wavelengths of light projecting from altered by the reticle; a second diffraction grating configured to multiplexing the collimated light projecting from collimated by the lens; and a third lens configured to projecting the multiplexed light onto an object plane, wherein the multiplexed light is used to generate an image of an object in the object plane.

20 Claims, 12 Drawing Sheets

SYSTEMS AND METHODS OF SINGLE-SHOT SPATIAL FREQUENCY MODULATION IMAGING

CROSS REFERENCE TO RELATED APPLICATIONS

This application claims priority to U.S. Provisional Application No. 63/224,158, filed on Jul. 21, 2021, and entitled "SYSTEMS AND METHODS OF SINGLE-SHOT SPATIAL FREQUENCY MODULATION IMAGING", the entirety of which is hereby incorporated by reference.

FIELD

The present disclosure relates generally to imaging and more particularly to single-shot spatial frequency modulation imaging systems.

BACKGROUND

Capturing high-resolution images of small objects is a technological area in which many imaging techniques are used for a wide variety of applications including in medicine and biology. One such technique, spatial frequency imaging, is used to separate the effects of light scattering and absorption to approximately quantify portions of one or more objects.

Speed, depth of field, resolution of image, and area of capture are some of the attributes by which imaging techniques may be evaluated. Typically, in spatial frequency imaging, an input pattern may be projected onto a sample using a projector. The sample, with the projected input pattern, may be captured using a camera system. Through post-processing of the output of the camera system, absorption and scattering properties may be extracted.

Conventional methods of spatial frequency imaging rely on moving parts and sequential data acquisition. Using conventional techniques, a light source such as a laser may be focused into a line which is modulated by successive patterns then scanned against an object to build up an image. By using a line or a point, the light can be scanned across the object after the full pattern set modulates the light at each object location. Light of different spatial frequencies are successively transmitted through a series of lenses and onto an object before being captured. To capture an image of the object, a series of spatial frequencies must be projected onto the object and the light received must be processed. Contemporary methods of imaging utilize a spinning reflective wheel, beam scanning system, or spatial light modulator to proceed through a series of spatial frequencies being projected. However, the reliance of contemporary methods of spatial frequency imaging on moving parts causes greater difficulty in the capturing of images and risk of errors in the breakdown of parts.

SUMMARY OF THE INVENTION

What is needed is an imaging system capable of producing super-resolution images in real-time without requiring moving parts. Using the systems and methods described herein, rather than scanning beams across masks, or rotating masks to create beams, the systems and methods described herein create a continuum of line cursors projecting through a stationary mask by wavelength modulation. As described herein, the line cursors are recombined after they are modulated and projected simultaneously on the object. The present systems and methods achieve the ability to generate an image of an object in real-time without sequential data acquisition as well as provide a method for multiplexing spatial modulations along one dimension.

As described herein, an imaging system may be used to provide an illumination scheme which improves resolution without post-processing and provides resolution improvements when not operating as a spatial frequency modulation imaging ("SPIFI") platform. An image system as described herein has the ability to multiplex spatial information along one axis in a unique way. A multiplexing function as described herein may be used for pulse measurement in a variety of applications.

Embodiments of the present disclosure include a system for generating an image of an object, the system comprising: a light source configured to project a beam of light; a first lens to generate a beam focused along one dimension and collimated along the transverse dimension; a first diffraction grating configured to separate wavelengths of the focused beam of light; a second lens configured to focus light projecting from the first diffraction grating; a reticle configured to alter each wavelength of light focused by the second lens; a third lens configured to collimate the light projecting from the reticle; a second diffraction grating configured to multiplex the collimated light projecting from the third lens; and a fourth lens configured to project the multiplexed light onto an object plane.

Embodiments of the present disclosure also include a method for generating an image of an object, the method comprising: projecting a beam of light through a first lens to generate a beam focused along one dimension and collimated along the transverse dimension onto a first diffraction grating; separating, with the first diffraction grating, wavelengths of the focused beam of light; focusing, with a second lens, light projecting from the first diffraction grating; altering, with a reticle, each wavelength of light focused by the second lens; collimating, with a third lens, the light projecting from the reticle; multiplexing, with a second diffraction grating, the collimated light projecting from the third lens; and projecting, with a fourth lens, the multiplexed light onto an object plane.

Embodiments of the present disclosure also include an imaging system comprising: a light source configured to project a beam of light; a first lens to generate a beam focused along one dimension and collimated along the transverse dimension; a first diffraction grating configured to separate wavelengths of the beam of light; a second lens configured to focus light projecting from the first diffraction grating; a reticle configured to alter each wavelength of light focused by the second lens; a third lens configured to collimate the light projecting from the reticle; a second diffraction grating configured to multiplex the collimated light projecting from the third lens; a fourth lens configured to project the multiplexed light onto an object plane; and an image sensor configured to generate an image of the object.

Aspects of the above system, method, and imaging system include wherein the reticle alters a spatial frequency of each wavelength, wherein the first diffraction grating is at the focal plane of the first lens, wherein the reticle is at a focal plane of the second lens, wherein the first lens is a cylindrical lens, wherein the third lens focuses the light projecting from the first diffraction grating to a line at the reticle, and/or wherein the multiplexed light is projected by the fourth lens in a line at the object plane.

Embodiments include the system further comprising: a fifth lens configured to project light projecting from the object plane; a third diffraction grating configured to diffract light projected from the fifth lens; and a sixth lens configured to project light diffracted by the third diffraction grating. Aspects of the above system include wherein the system further comprises an image sensor configured to receive light projected by the sixth lens, wherein the image sensor generates an image of an object in the object plane, wherein the system further comprises an imaging spectrometer configured to receive light projected by the sixth lens, and/or wherein the imaging spectrometer generates an image of an object in the object plane.

As described herein, an imaging system in which, rather than scanning beams across masks, rotating masks to create beams, or scanning the pattern, e.g., on a build surface during a selective laser melting ("SLM") process, a continuum of line cursors may be created by projecting light through a stationary mask by wavelength modulation.

In addition to potential uses for imaging and reconstructing objects, the systems and methods presented herein provide a powerful illumination technique. For example, in typical light sheet microscopy, the numeric aperture of the light sheet is relatively low because focusing is limited to a single direction. Using the illumination technique presented herein, a wide sheet of illumination is achieved with a high numeric aperture in both transverse dimensions.

In some embodiments, an imaging system as described herein may provide a benefit of reducing or eliminating unnecessary aberrations and may eliminate wavelength dependent defocus.

Additional features and advantages are described herein and will be apparent from the following description and the figures.

BRIEF DESCRIPTION OF THE DRAWINGS

A further understanding of the nature and advantages of the present invention may be realized by reference to the following drawings which are not necessarily drawn to scale. In the appended figures, similar components or features may have the same reference label.

DETAILED DESCRIPTION

Figure 1A:
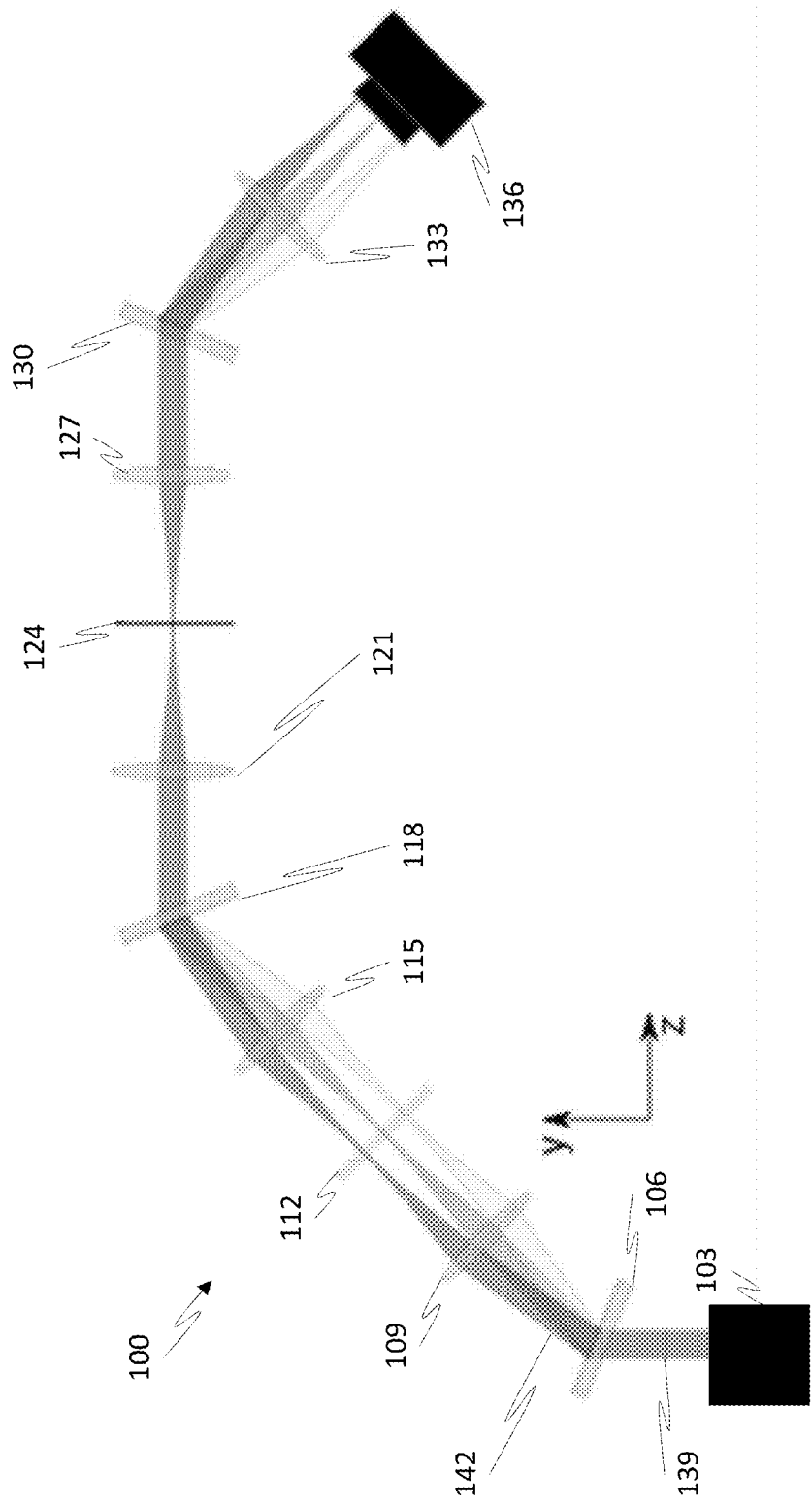
FIG. 1A is an illustration of an imaging system in accordance with one or more embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As described above, what is needed is an imaging system capable of producing super-resolution line images in a single shot measurement without requiring moving parts. Using the systems and methods described herein, rather than scanning beams across masks, or rotating masks to create beams, a continuum of line cursors may be projected through a stationary mask by wavelength multiplexed modulation. The systems and methods described herein may be used to achieve the ability to generate an image of an object in real-time without requiring post-processing.

Figure 1B:
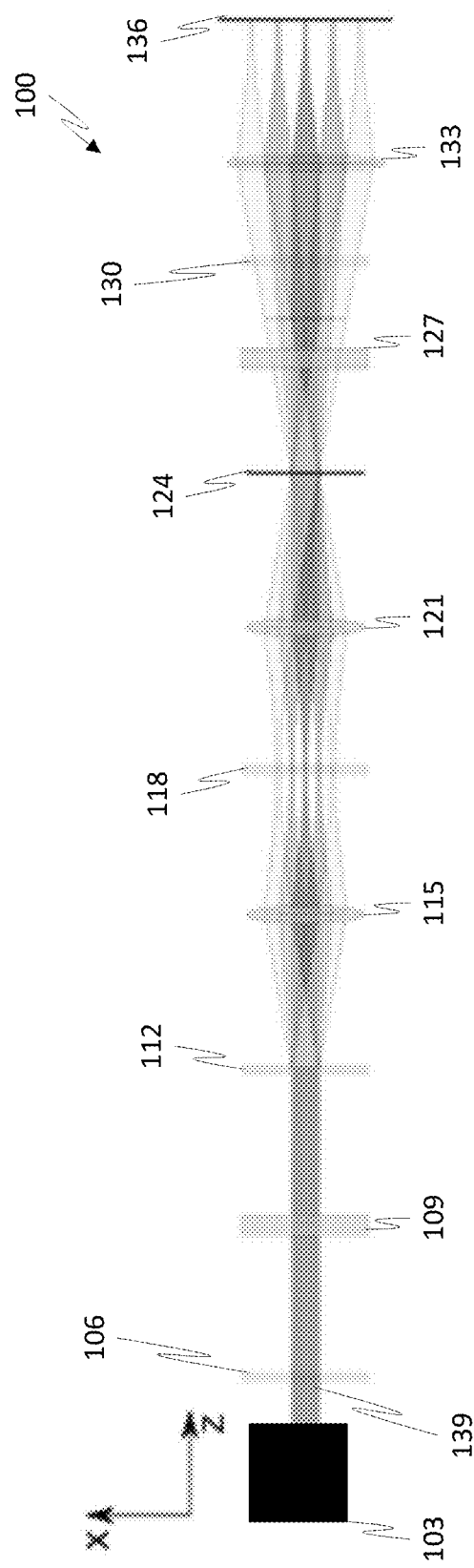
FIG. 1B is an illustration of is an illustration an imaging system in accordance with one or more embodiments of the present disclosure.

As illustrated in FIGS. 1A and 1B, an imaging system may comprise a number of diffraction gratings 106, 118, 130 and lenses 109, 115, 121, 127, 133 and may be configured to generate an image of an object within an object plane 124. While FIG. 1A shows an illustration of an exemplary imaging system from a top down point of view and FIG. 1B shows the same exemplary imaging from a side view, it should be appreciated the same or similar imaging systems may be implemented in other orientations. For example, the distances and angles between elements in FIGS. 1A and 1B should not be considered limiting in any way.

As illustrated in FIGS. 1A and 1B, an imaging system 100 may comprise a broadband light source 103 and a first diffraction grating 106. The colors in FIG. 1A and FIG. 1B represent different wavelengths of the light. In FIG. 1B, the x-z slice, the zeroth diffracted order of the yellow and orange beams are not shown for clarity.

A light source 103 may in some embodiments comprise a light-emitting device capable of providing light in a broad and continuous spectrum of frequencies. While described as a broadband light source, it should be appreciated the light source 103 may in some embodiments, comprise a laser and/or a light source of a narrower band of wavelengths.

The light source 103 may direct light 139 into a first diffraction grating 106. Each of the diffraction gratings as described herein may be optical elements which divide light of a plurality of wavelengths into several beams or disperse light of a plurality of wavelengths into a continuous spectrum, in which light of different wavelengths are diffracted different amounts. The first diffraction grating 106 may in some embodiments be configured to separate wavelengths of the light 139 from the light source 103 across a spread as illustrated by the light 142 of FIG. 1A.

While the light 142 illustrated in FIG. 1A is illustrated as having three colors, or wavelengths, it should be appreciated that the light 142 as diffracted by the first diffraction grating 106 may be a continuous spectrum of light and may comprise light of any number of wavelengths. In some embodiments, a light source 103 may be chosen such that a dispersion of the light through the first diffraction grating 106 fills a first cylindrical lens 109. In this way, light of a wide range of wavelengths may be projected by the cylindrical lens 109 onto a reticle mask 112 as described below.

The light projected by the cylindrical lens 109 onto the reticle mask 112 may next pass through a first spherical lens 115 and onto a second diffraction grating 118.

The second diffraction grating 118 and the number of wavelengths comprised by the light source 103 may be selected such that a wavelength spread of light emitting from the first diffraction grating 106 fills the reticle or reticle mask 112 in the y-z profile as illustrated in FIG. 1A and the wavelength spread of light emitting from the second diffraction grating 118 fills a second spherical lens 121, which may also be referred to as an objective lens, in the x-z profile as illustrated in FIG. 1B. The objective lens 121 may be used to image an object in the object plane. As illustrated by the y-z plot of FIG. 1A and the x-z plot of FIG. 1B, the light projected from the reticle 112 is spread full across both directions of the spherical lens 115 before reaching the second diffraction grating 118.

Figure 2B:
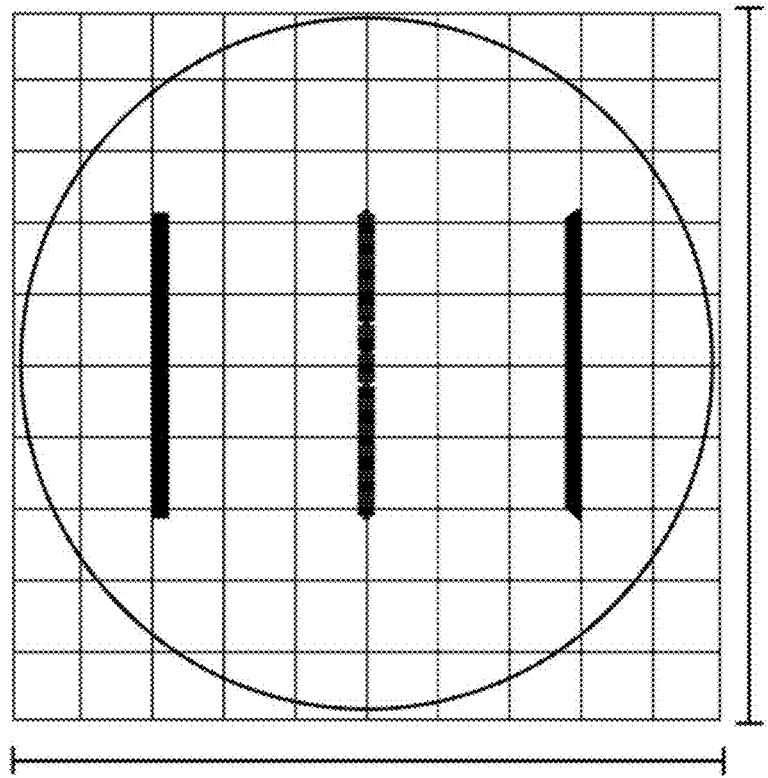
FIG. 2B is an illustration of light projected toward reticle in accordance with one or more embodiments of the present disclosure.
Figure 2A:
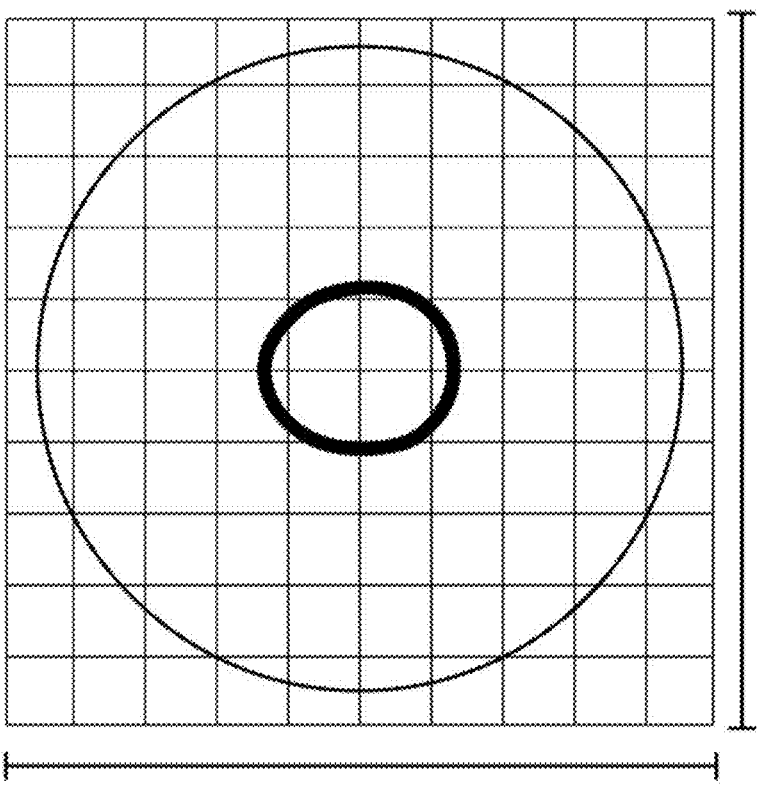
FIG. 2A is an illustration of light at a first diffraction grating in accordance with one or more embodiments of the present disclosure.

FIG. 2A illustrates the light as it reaches the first diffraction grating 106. As can be appreciated, all wavelengths of the source light overlap upon reaching the first diffraction grating 106. In this exemplary illustration, the beam footprint appears elliptical as the first diffraction grating 106, as illustrated in FIG. 1A, is positioned at an angle.

As illustrated in FIG. 1B, wavelengths of light projected from the reticle 112 toward the first spherical lens 115 reach the first spherical lens 115 at a varying angles such that the second spherical lens 121 is filled with light after the light passes through the second diffraction grating 118. In this way, maximum resolution of an object in the object plane 124 can be realized. Each range of wavelengths of light may be directed by each diffraction grating 106, 118, 130 at a particular angle. While the light 142 emitting from the first diffraction grating 106 is illustrated in FIG. 1A as including three wavelengths, it should be appreciated that the light 142 may be diffracted such that the light spreads in a continuum of wavelengths. The continuum of wavelengths diffracted by the diffraction grating 106 may be projected by the cylindrical lens 109 toward the reticle 112 such that each wavelength or group of wavelengths reaches the reticle 112 in a different vertical line. Each line of wavelengths may be focused by the cylindrical lens 109 onto the reticle 112. As illustrated in FIG. 2B, the light as it hits the reticle may be lines of light of different wavelengths. Each wavelength may hit the reticle 112 along a different line. While three lines are shown in the illustration, it should be appreciated that the wavelengths of the light may be a continuum and an infinite number of wavelengths may be spread, in lines, across the reticle 112.

Figure 1C:
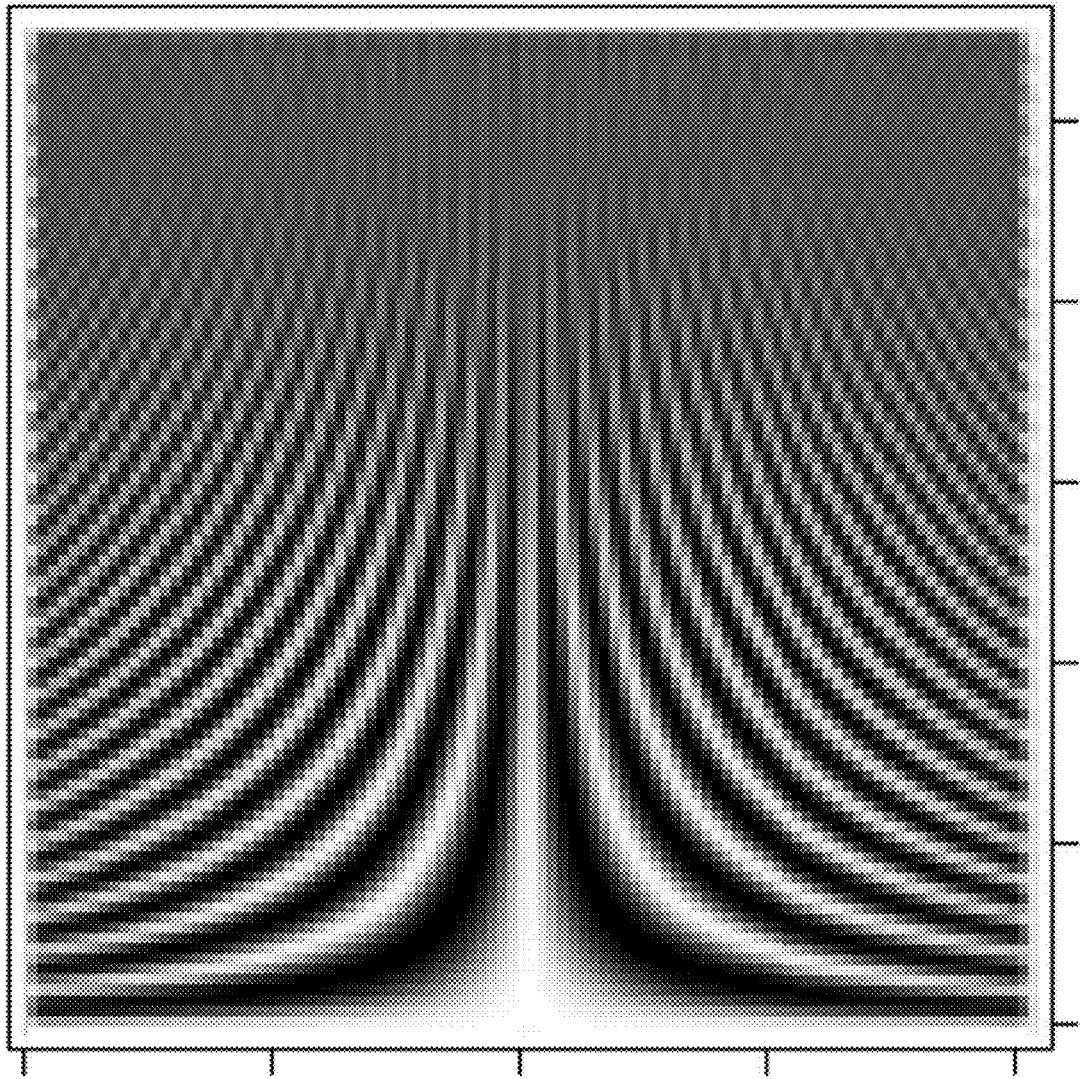
FIG. 1C is an illustration of a reticle in accordance with one or more embodiments of the present disclosure.

The reticle 112 may be referred to as a mask or as a SPIFI reticle. The reticle may be an amplitude or phase mask designed to vary spatial frequency of light as a function of wavelength is placed at the focal plane of the first spherical lens. In some embodiments, the reticle may comprise a pattern such as illustrated in FIG. 1C. The white or clear portions of the mask may be translucent such that all or nearly all of the light passes. For example, the white or clear portions of the mask may enable 90-100% of light to pass. The black portions of the mask may be opaque such that none or nearly none of the light passes and all of the light is blocked. For example, the black portions of the mask may enable only 0-10% of light to pass. While the shape of the mask in FIG. 1C is a square, it should be appreciated that a mask may be in any shape, such as a rectangle or circle. Furthermore, the pattern may be other patterns instead of the pictured pattern of FIG. 1C.

A phase mask or reticle effectively affects the path length of light as the light travels through the reticle as a function of position. An amplitude mask effectively blocks portions of light as a function of position. By projecting different wavelengths of light onto different portions of the reticle, each wavelength may be varied in a different manner based on the reticle pattern.

Figure 2D:
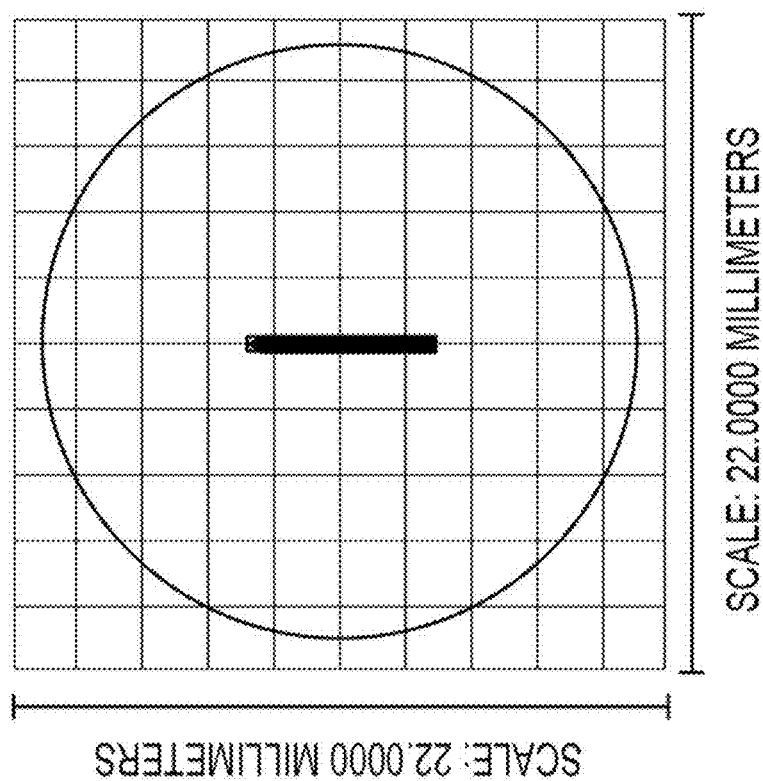
FIG. 2D is an illustration of light at a diffraction grating in accordance with one or more embodiments of the present disclosure.
Figure 2C:
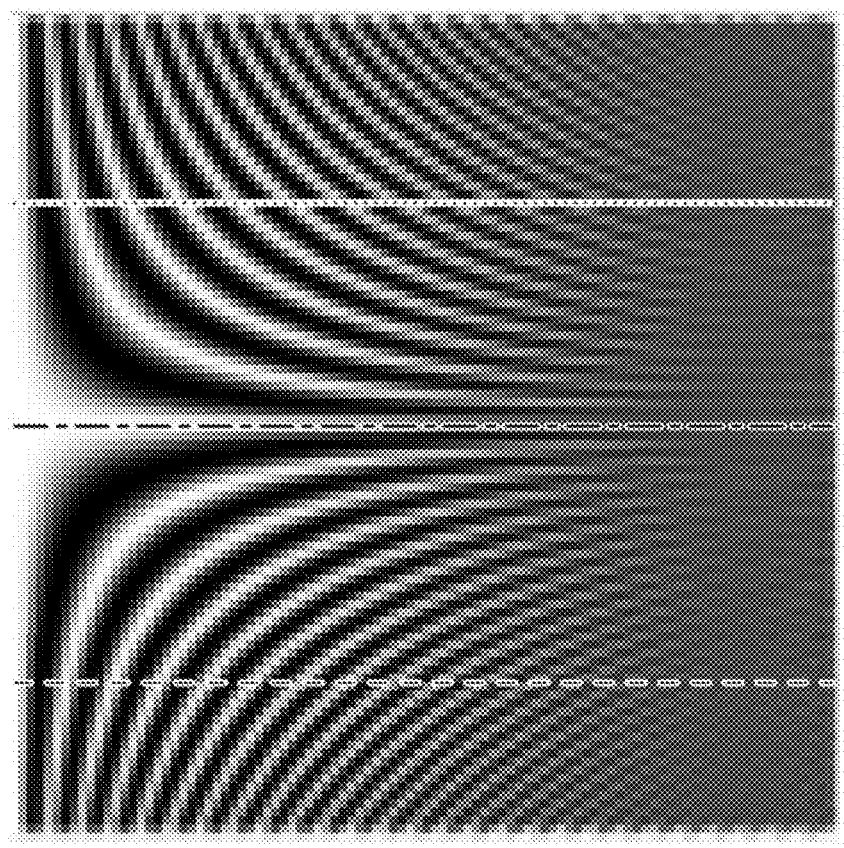
FIG. 2C is an illustration of light on a reticle mask in accordance with one or more embodiments of the present disclosure.

Each wavelength is spatially separated and focused to a line at the reticle plane as shown in FIG. 2C. These lines of wavelengths are transmitted through the reticle, and a different spatial frequency is imposed on each wavelength by the reticle. FIG. 2C shows how the wavelengths are aligned with the reticle pattern. The white areas of the reticle pattern in FIG. 2C represent areas in which light passes through with full or nearly full, e.g., 100%, transmission, while the black areas of the reticle pattern in FIG. 2C represent areas in which light is blocked with little to no, e.g., 0%, transmission. As such, a different spatial frequency pattern is imposed at each wavelength.

While the embodiments describe herein relate generally to the use of an amplitude mask, it should be appreciated that the same or similar systems may be implemented using a phase mask. For example, in some embodiments, the reticle may impart a phase shift in the light as opposed to attenuating energy of the light. A phase mask may comprise sections of the mask with a first index of refraction, for example 1.5, and sections of the mask with a second index of refraction, for example 1.6.

The spatial light distribution hitting the reticle mask may be altered in a different way based on the mask or reticle pattern being used. The light, altered by the reticle mask, is projected onto an object in the object plane in such a way as to enable an image of the object to be captured by an image capture device such as an image sensor. The wavelengths and spread of light projected into the object plane are based on the particular pattern of the reticle. As can be appreciated by the illustrations of FIGS. 1A, 1B, and 2C, the wavelengths are focused onto the reticle 112 by the cylindrical lens 109.

After light passes through the reticle 112, a first spherical lens 115 re-collimates the light and directs the beams to a second diffraction grating 118. The second diffraction grating 118 may be configured to multiplex the wavelengths back into a single line beam which is then projected by a second spherical lens 121 into the object plane 124 and onto an object in the object plane 124. As illustrated in FIG. 2D, the light as it hits the second diffraction grating 118 may be a single line beam. FIG. 2D shows the footprint of the of the beams on the second diffraction grating 118, after passing through the reticle 112 and the first spherical lens 115. Each wavelength of the light overlaps upon reaching the second diffraction grating 118. The light passing through the second diffraction grating 118 may be referred to as an excitation beam.

The light projected from the second diffraction grating 118 may be projected by the second spherical lens 121 focused on the object plane 124. Each position on the reticle 112 may be mapped to the object plane 124 via wavelength encoding. The light passing through the object plane 124 can be imaged directly to a camera at the camera sensor plane 136 resulting in improved imaging or may be captured with an imaging spectrometer at the camera sensor plane 136 for super resolution. An imaging spectrometer may be any instrument capable of being used in hyperspectral imaging and imaging spectroscopy to acquire a spectrally-resolved image of an object or scene.

Figure 2E:
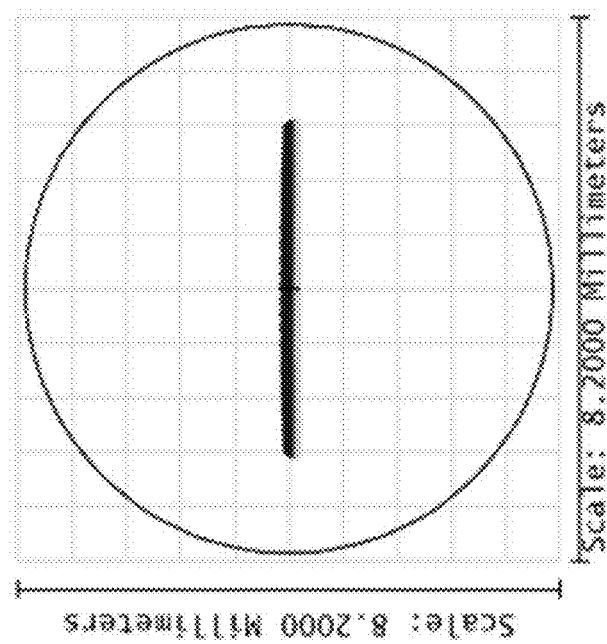
FIG. 2E is an illustration of light at an object plane in accordance with one or more embodiments of the present disclosure.

FIG. 2E illustrates the light as it passes through the object plane 124 where a specimen or object to be imaged may be placed. As should be appreciated, at the object plane 124, the colors or wavelengths of the projected light overlap.

After the object plane 124, the light may pass through a second cylindrical lens 127, a third diffraction grating 130, and a third spherical lens 133 before reaching an image sensor plane 136, where a device such as a camera or imaging spectrometer may be used to capture the light. The second cylindrical lens 127, third diffraction grating 130, and third spherical lens 133 may in some embodiments be designed to perform a Fourier transform of the light having passed through the object plane 124. In this way, no post-processing of the captured light data may be required to view an image of the object.

To perform a similar type of imaging using conventional systems, moving parts and sequential data acquisition are required. Using conventional techniques, a light source such as a laser may be focused into a line. The line source is next imaged to the object and scanned against the object to build up an image. By using a line or a point of light, the light can be scanned across the image. Light of different wavelengths are transmitted through a series of lenses and onto an object before being captured. To capture an image of the object, a series of spatial frequencies must be projected onto the object and the light received must be processed. Instead of a reticle mask as described herein, a spinning reflective wheel may be used to proceed through a series of spatial frequencies being projected. The present systems and methods achieve the ability to generate an image of an object in real-time without requiring moving parts.

As disclosed herein, rather than scanning beams across masks, rotating masks to create beams, or scanning the pattern, e.g., on a build surface during a selective laser melting ("SLM") process, the systems and methods described herein create a continuum of line cursors projecting through a stationary mask by wavelength modulation.

In addition to potential uses for imaging and reconstructing objects, the systems and methods presented herein provide a powerful illumination technique. For example, in typical light sheet microscopy, the numeric aperture of the light sheet is relatively low because focusing is limited to a single direction. Using the illumination technique presented herein, a wide sheet of illumination is achieved with a high numeric aperture in both transverse dimensions.

Figure 3:
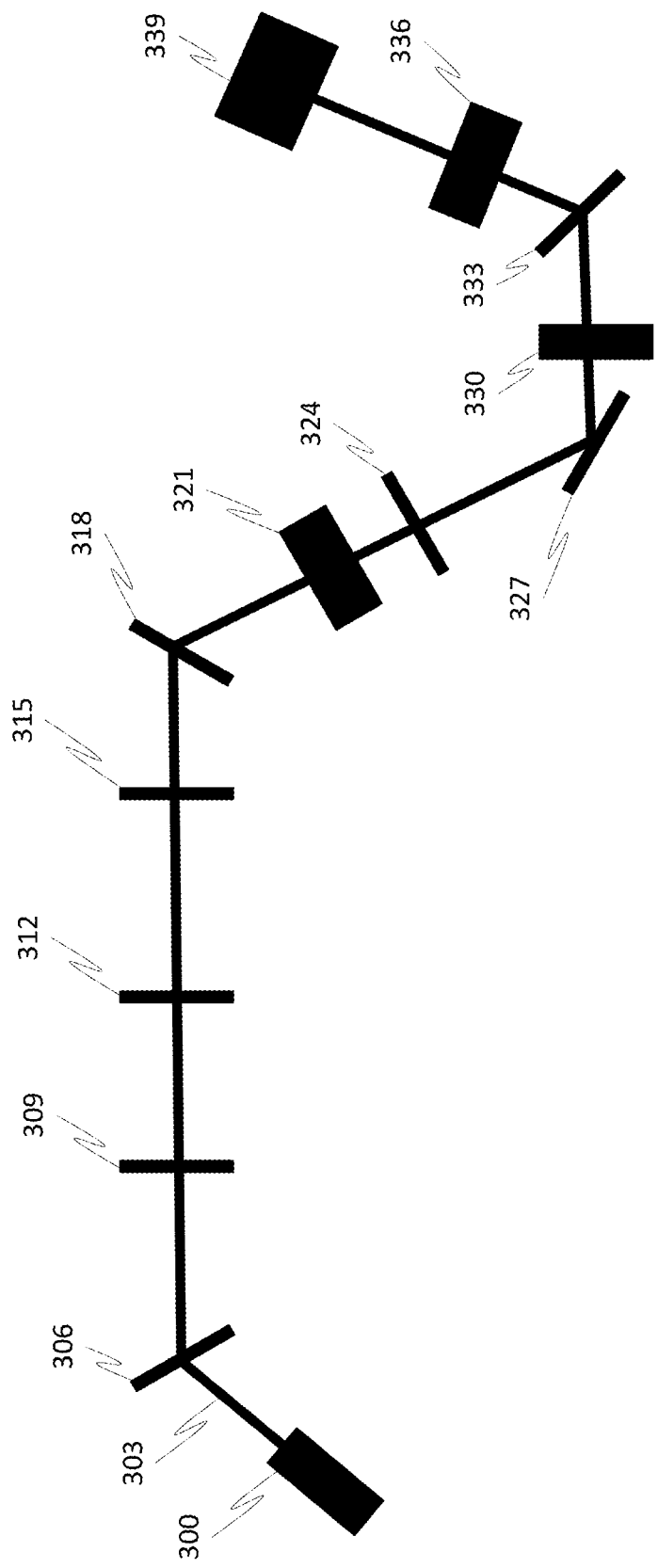
FIG. 3 is a photograph of a system in accordance with one or more embodiments of the present disclosure.

As illustrated in FIG. 3, a system such as described herein may be achieved in a lab setting. A light source 300 projects a light beam 303 through a first diffraction grating 306. The light passes through the first diffraction grating 306 and onto a first cylindrical lens 309. The light is projected by the first cylindrical lens 309 through a reticle 312. After passing through the reticle 312, the light passes through a first spherical lens 315. The light is projected by the first spherical lens 315 onto a second diffraction grating 318. The light passes through the second diffraction grating 318 and onto a second spherical lens 321 before projecting onto the object in the object plane 324. After the object plane 324, the light beam 303 proceeds through a second cylindrical lens 330, a third diffraction grating 333, and a third spherical lens 336 before reaching an image sensor 339. One or more mirrors 327 or other reflective devices may be used to alter the shape of the system without affecting the imaging of the specimen.

Figure 4B:
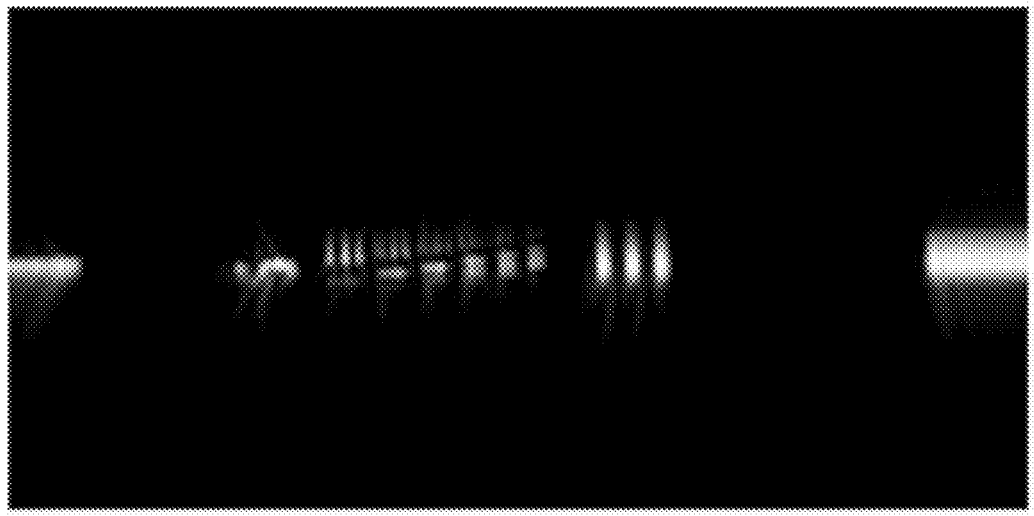
FIG. 4B is an illustration of an image capture without using the systems and methods described herein.
Figure 4A:
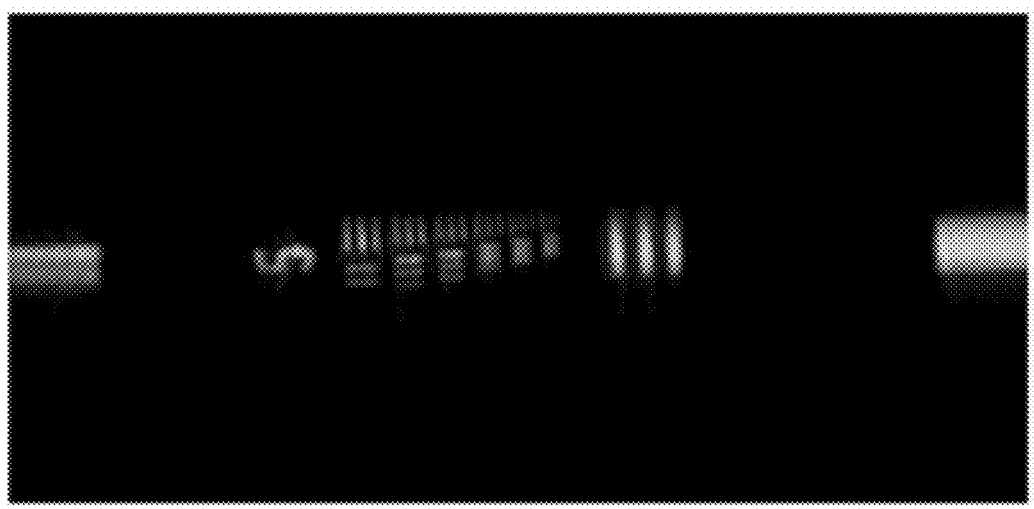
FIG. 4A is an illustration of example image using a in accordance with one or more embodiments of the present disclosure.

Proof-of-principle imaging generated using a system such as Described herein is provided in FIGS. 4A, 4B, and 5A-5C. The systems and methods described herein provide an advantage to contemporary imaging techniques by providing the ability to illuminate a wide field of view with a bright coherent light while taking advantage of the full numerical aperture of the optical system. With no reconstructions, an imaging system as described herein immediately improves the resolution of an optical system, as shown in FIGS. 4A and 4B. An example image of a resolution target taken with a line beam using the systems and methods described herein is illustrated in FIG. 4B. An example image captured without using the systems and methods described herein is illustrated in FIG. 4B. As can be appreciated, imaging the same field of view with and without the systems described herein present illustrates expanded spatial frequency support. The systems and methods described herein effectively increase a modulation transfer function ("MTF") along an extended illumination axis by superimposing spatial frequency projections.

Figure 5C:
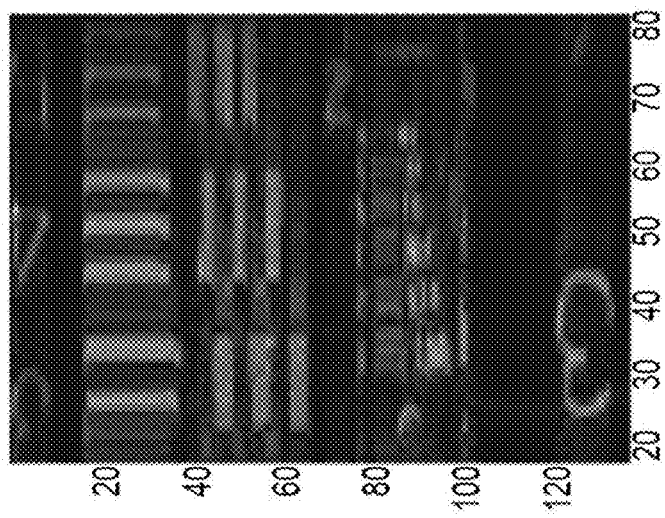
FIG. 5C is an illustration of a third order image captured using a system in accordance with one or more embodiments of the present disclosure.
Figure 5B:
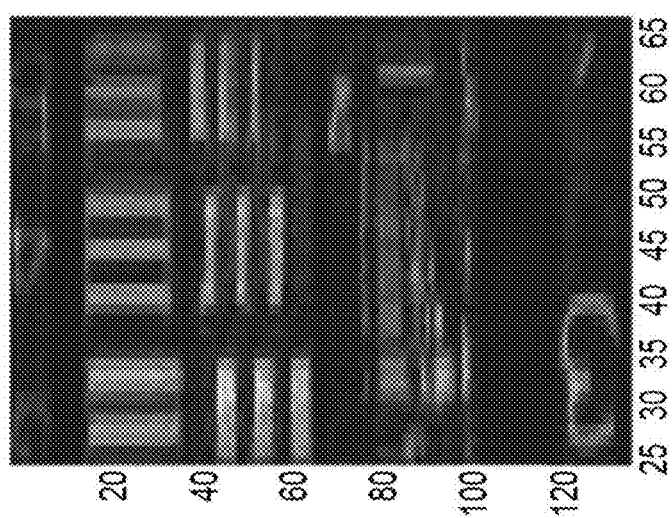
FIG. 5B is an illustration of a second order image captured using a system in accordance with one or more embodiments of the present disclosure.
Figure 5A:
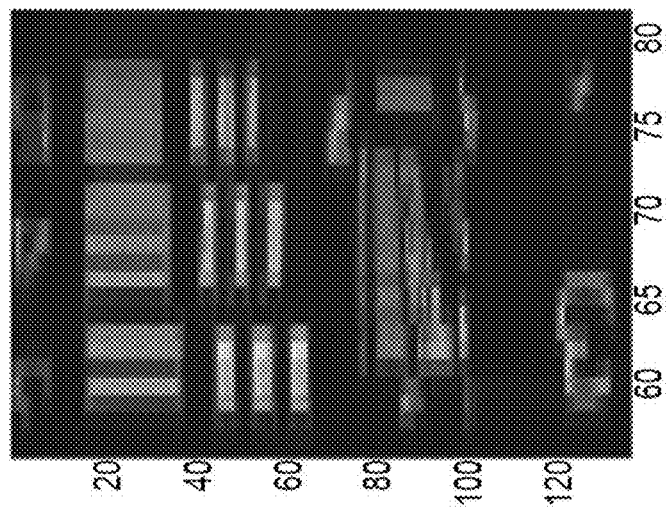
FIG. 5A is an illustration of a first order image captured using a system in accordance with one or more embodiments of the present disclosure.

By using systems and methods as described herein, greater resolution enhancements may be achieved as compared to conventional systems. In some embodiments, images may be processed by taking a Fourier transform along the modulated direction to reconstruct the images. Such a Fourier transform can be created in real-time or near real-time. For example, preliminary data for the disclosed methods of image capture is shown in FIGS. 5A-5C. A first order image after processing using systems and methods described herein is illustrated in FIG. 5A. A second order image, illustrated in FIG. 5B, after processing reveals a better image resolution, while a third order image, illustrated in FIG. 5C, after additional processing, reveals even better image resolution.

Figure 6:
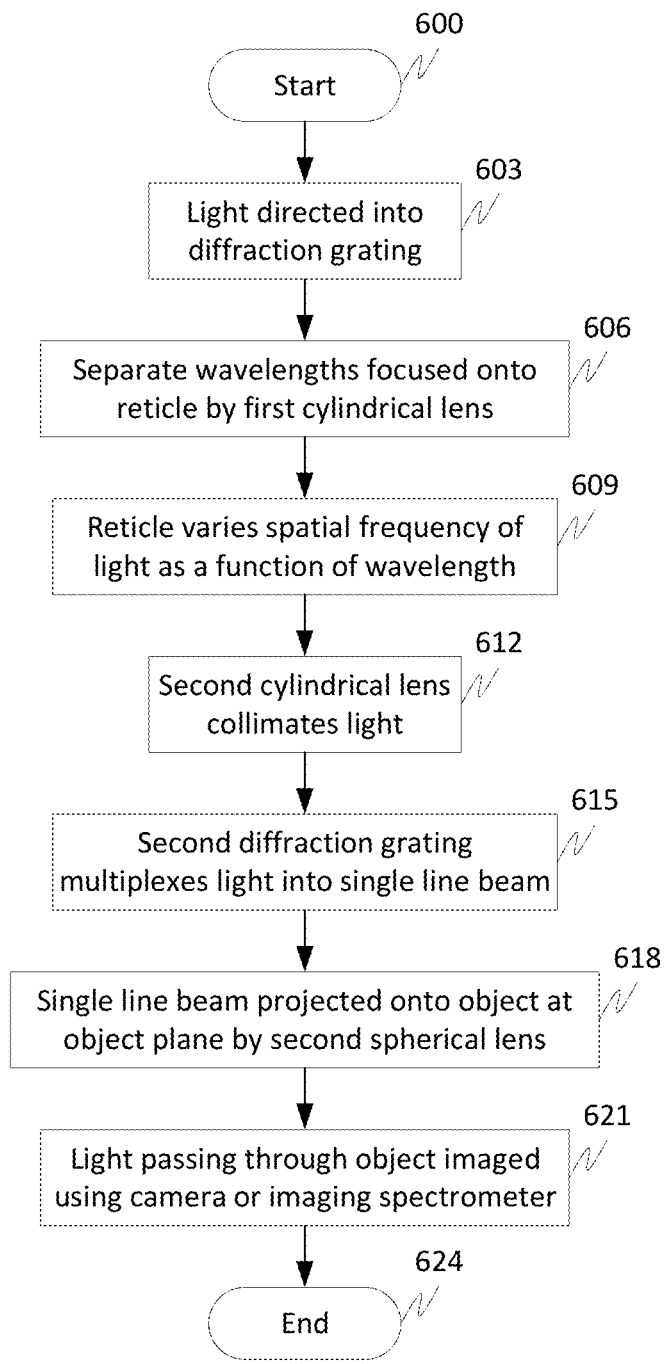
FIG. 6 is a flowchart of a method in accordance with one or more embodiments of the present disclosure.

As illustrated in FIG. 6, a method of generating an image using single-shot spatial frequency modulation may be performed using an imaging system as described herein. The method may begin at 600 in which an imaging system such as described herein and illustrated in FIGS. 1A-1C may be arranged. Light projected from the imaging system may be as illustrated in FIG. 2A. At 603, the light may be projected from a broadband light source and directed into a first diffraction grating. The first diffraction grating may be configured to separate wavelengths of the light and project the separated wavelengths into a first cylindrical lens. The light projected from the first diffraction grating may be as illustrated in FIG. 2B.

At 606, the wavelengths separated by the first diffraction lens may be focused onto a reticle or mask such as illustrated in FIG. 1C by the first cylindrical lens. The light on the reticle may be as illustrated in FIG. 2C.

At 609, the reticle may vary the spatial frequency of the light as a function of wavelength based on the position of the reticle through which each wavelength of light passes. The reticle may in some embodiments be a phase mask or an amplitude mask.

At 612, the light may pass through a cylindrical lens which may be configured to collimate the light having passed through and varied by the reticle. At 615, the collimated light may be multiplexed by a second diffraction grating and may form a single line beam. The light of the single line beam may be as illustrated in FIG. 2D. At 618, the single line beam may be projected and focused onto an object plane by a second spherical lens. The light at the object plane may be as illustrated in FIG. 2E.

At 621, the light passing through the object plane may be imaged using an image sensor or imaging spectrometer. After passing through the object plane, a Fourier transform may be optically performed using one or more lenses and a diffraction grating. For example, light from the object plane may first pass through a cylindrical lens, a diffraction grating, and a spherical lens, before reaching the image sensor. At 624 the method may end with an image of an object in the object plane.

The systems and methods of imaging as described herein may enable a user to view an object in extremely high detail of a specimen in real time. Such a system or method may be useful in a wide range of applications, such as refractive eye surgery, 3D printing, etc., and provides a benefit over conventional methods of imaging in that a high resolution image of a microscopic object may be obtained in real-time without requiring post-processing and without requiring the use of moving parts.

Figure 7A:
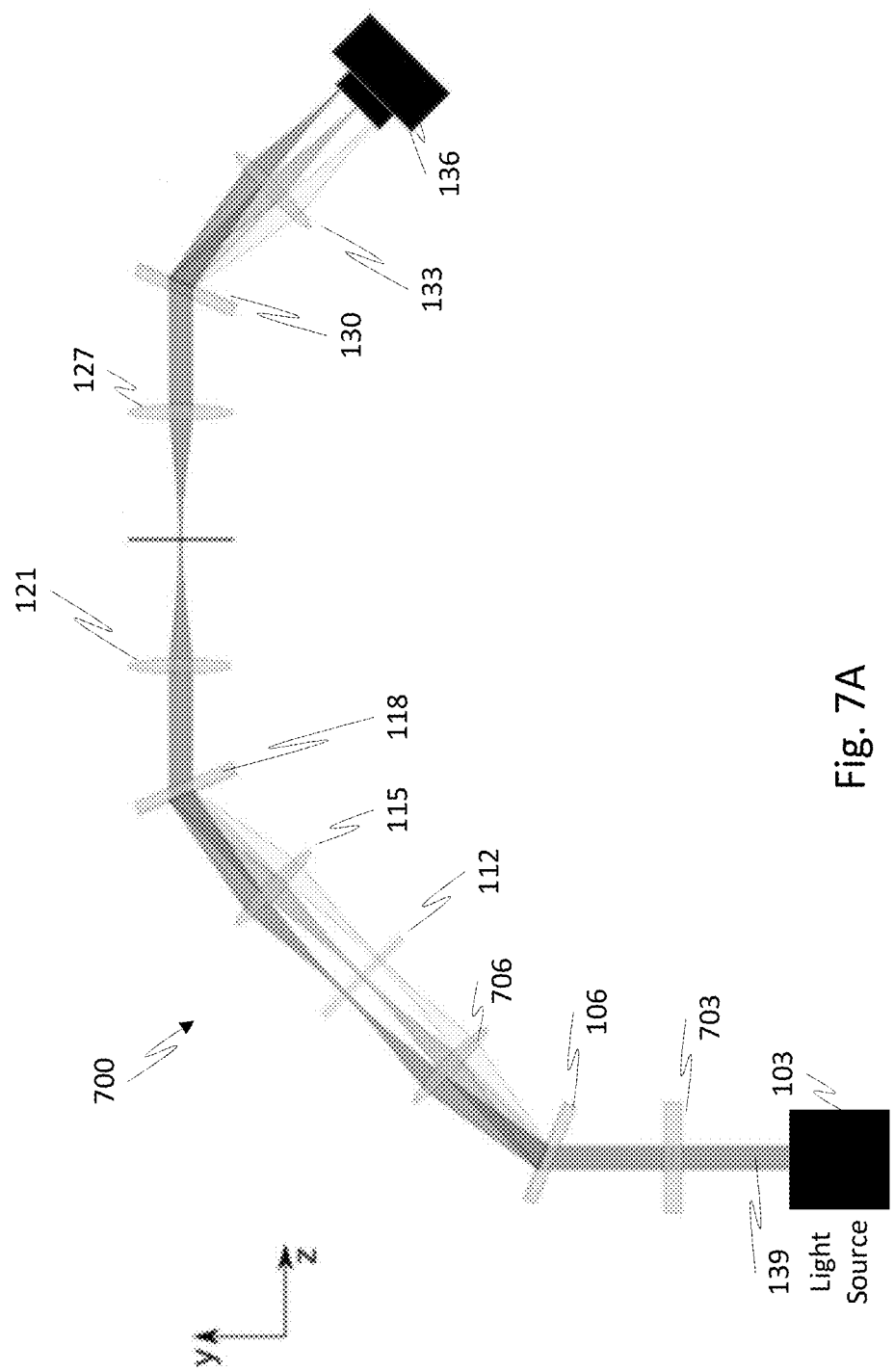
FIG. 7A is an illustration of an imaging system in accordance with one or more embodiments of the present disclosure.
Figure 7B:
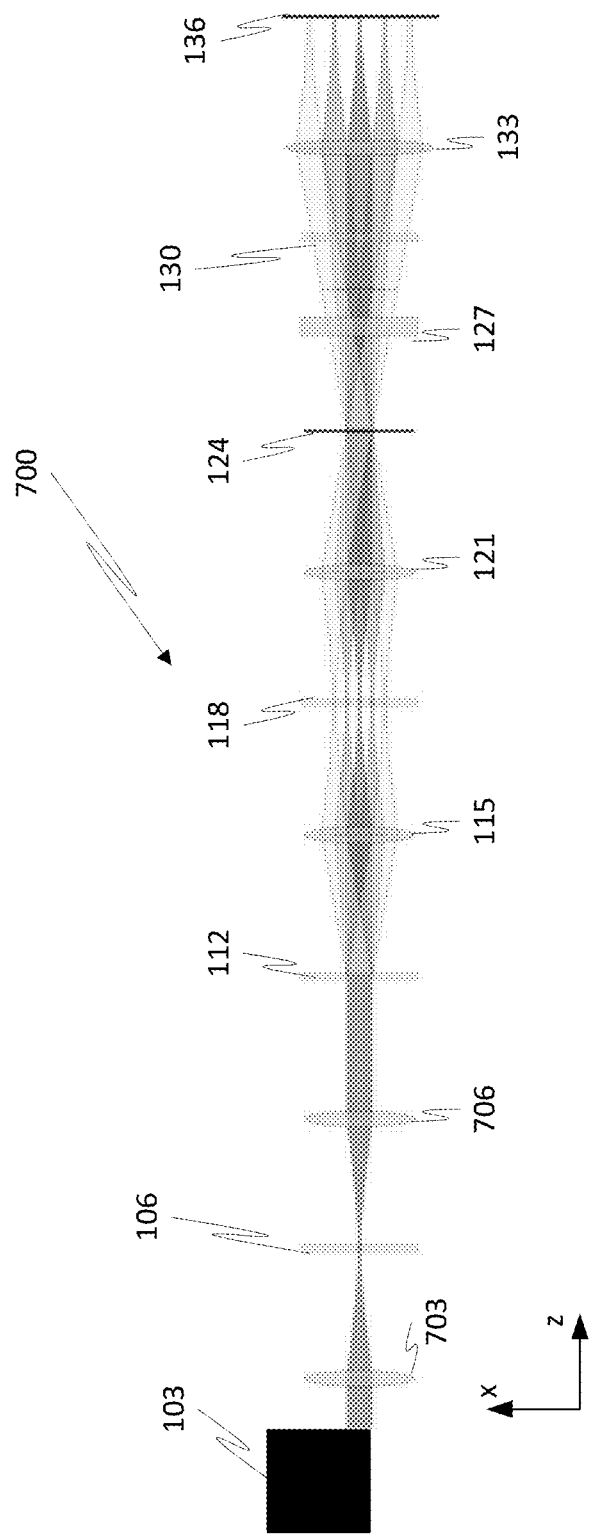
FIG. 7B is an illustration of is an illustration an imaging system in accordance with one or more embodiments of the present disclosure.

It should be appreciated that the lenses used in the imaging systems described herein may be in a variety of orders. For example, an embodiment of an imaging system 700 which may be used as described herein is illustrated in FIGS. 7A and 7B. The imaging system 700 differs from that of FIGS. 1A and 1B in that instead of using a cylindrical lens after the first diffraction grating 106, a first cylindrical lens 703 is placed before the first diffraction grating 106. Also, two spherical lenses 706 and 115 are placed between the diffraction gratings 106 and 115 on either side of the reticle 112. In this way, the imaging system 700 may be made symmetric and the performance of the imaging system 700 may be improved. An imaging system 700 such as that illustrated in FIGS. 7A and 7B may provide for a benefit of reducing or eliminating unnecessary aberrations, while an imaging system 100 as illustrated in FIGS. 1A and 1B may introduce unnecessary aberrations by breaking the symmetry in what would otherwise be a zero dispersion system. In the imaging system 700 of FIGS. 7A and 7B, with the absence of the modulation reticle the beam entering the system is identical to the beam exiting the system with a sign change on the coordinates. This eliminates some wavelength dependent defocus which may affect the imaging system 100 of FIGS. 1A and 1B.

While described herein as being performed by a processor of a processing system 108, it should be appreciated the systems and methods described herein may be performed by a hardware device implemented in silicon or hardware—as opposed to software.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Embodiments of the present disclosure include a system for generating an image of an object, the system comprising: a light source projecting a beam of light; a first diffraction grating separating wavelengths of the projected beam of light; a first lens focusing the wavelengths of the projected beam of light separated by the first diffraction grating; a reticle altering each wavelength of light focused by the first lens; a second lens collimating the wavelengths of light altered by the reticle; a second diffraction grating multiplexing the light collimated by the lens; and a third lens projecting the multiplexed light onto an object plane, wherein the multiplexed light is used to generate an image of an object in the object plane. Aspects of the above system include wherein the reticle alters a spatial frequency of each wavelength. Aspects of the above system include wherein the reticle is at a focal plane of the first lens. Aspects of the above system include wherein the first lens is a cylindrical lens. Aspects of the above system include the system further comprising a fourth lens projecting light from the object plane; a third diffraction grating diffracting light projected by the fourth lens; and a fifth lens projecting light diffracted by the third diffraction grating. Aspects of the above system include wherein the image is generated by an image sensor receiving the light projected by the fifth lens. Aspects of the above system include wherein the image is generated using an imaging spectrometer receiving the light projected by the fifth lens. Aspects of the above system include wherein the first lens focuses the light projecting from the first diffraction grating to a line at the reticle. Aspects of the above system include wherein the multiplexed light is projected by the third lens in a line at the object plane. Aspects of the above system include the system further comprising a cylindrical lens placed between the light source and the first diffraction grating. Aspects of the above system include wherein the first lens and the second lens are identical spherical lenses.

Embodiments include a method for generating an image of an object, the method comprising: projecting a beam of light onto a first diffraction grating; separating, with the first diffraction grating, wavelengths of the beam of light; focusing, with a first lens, light projecting from the first diffraction grating; altering, with a reticle, each wavelength of light focused by the first lens; collimating, with a second lens, the light projecting from the reticle; multiplexing, with a second diffraction grating, the collimated light projecting from the lens; and projecting, with a third lens, the multiplexed light onto an object plane, wherein the multiplexed light is used to generate an image of an object in the object plane.

Aspects of the above method include wherein the reticle alters a spatial frequency of each wavelength. Aspects of the above method include wherein the reticle is at a focal plane of the first lens. Aspects of the above method include wherein the first lens is a cylindrical lens. Aspects of the above method include the system further comprising a fourth lens configured to project light projecting from the object plane; a third diffraction grating configured to diffract light projected from the fourth lens; and a fifth lens configured to project light diffracted by the third diffraction grating. Aspects of the above method include wherein the image sensor generates an image of an object in the object plane. Aspects of the above method include wherein the imaging spectrometer generates an image of an object in the object plane. Aspects of the above method include wherein the first lens focuses the light projecting from the first diffraction grating to a line at the reticle. Aspects of the above method include wherein the multiplexed light is projected by the third lens in a line at the object plane.

Embodiments include an imaging system comprising: a light source, wherein the light source projects a beam of light; a first diffraction grating, wherein the first diffraction grating projects separated wavelengths of the beam of light projected by the light source; a first lens, wherein the first lens focuses the separated wavelengths projected by the first diffraction grating; a reticle, wherein the reticle alters each wavelength focused by the first lens; a second lens, wherein the second lens collimates the wavelengths altered from the reticle into a collimated beam of light; a second diffraction grating, wherein the second diffraction grating multiplexes the collimated beam of light projecting from the second lens; a third lens, wherein the third lens projects the multiplexed collimated beam of light onto an object in an object plane; and an image sensor, wherein the image sensor receives the light projected onto the object and generates an image of the object.

Aspects of the above imaging system include wherein the reticle alters a spatial frequency of each wavelength. Aspects of the above imaging system include wherein the reticle alters a spatial frequency of each wavelength. Aspects of the above imaging system include wherein the reticle is at a focal plane of the first lens.

What is claimed is:

1. A system for generating an image of an object, the system comprising:
   a light source projecting a beam of light;
   a first diffraction grating separating wavelengths of the projected beam of light;
   a first lens focusing the wavelengths of the projected beam of light separated by the first diffraction grating;
   a reticle altering each wavelength of light focused by the first lens;
   a second lens collimating the wavelengths of light altered by the reticle;
   a second diffraction grating multiplexing the light collimated by the lens; and
   a third lens projecting the multiplexed light onto an object plane, wherein the multiplexed light is used to generate an image of an object in the object plane.

2. The system of claim 1, wherein the reticle alters a spatial frequency of each wavelength.

3. The system of claim 1, wherein the reticle is at a focal plane of the first lens.

4. The system of claim 1, wherein the first lens is a cylindrical lens.

5. The system of claim 1, further comprising:
   a fourth lens projecting light from the object plane;
   a third diffraction grating diffracting light projected by the fourth lens; and
   a fifth lens projecting light diffracted by the third diffraction grating.

6. The system of claim 5, wherein the image is generated by an image sensor receiving the light projected by the fifth lens.

7. The system of claim 5, wherein the image is generated using an imaging spectrometer receiving the light projected by the fifth lens.

8. The system of claim 1, wherein the first lens focuses the light projecting from the first diffraction grating to a line at the reticle.

9. The system of claim 1, wherein the multiplexed light is projected by the third lens in a line at the object plane.

10. The system of claim 1, further comprising a cylindrical lens placed between the light source and the first diffraction grating.

11. The system of claim 10, wherein the first lens and the second lens are identical spherical lenses.

12. A method for generating an image of an object, the method comprising:
projecting a beam of light onto a first diffraction grating;
separating, with the first diffraction grating, wavelengths of the beam of light;
focusing, with a first lens, light projecting from the first diffraction grating;
altering, with a reticle, each wavelength of light focused by the first lens;
collimating, with a second lens, the light projecting from the reticle;
multiplexing, with a second diffraction grating, the collimated light projecting from the lens; and
projecting, with a third lens, the multiplexed light onto an object plane, wherein the multiplexed light is used to generate an image of an object in the object plane.

13. The method of claim 12, wherein the reticle alters a spatial frequency of each wavelength.

14. The method of claim 12, wherein the reticle is at a focal plane of the first lens.

15. The method of claim 12, wherein the first lens is a cylindrical lens.

16. The method of claim 12, further comprising:
projecting, with a fourth lens, light projecting from the object plane;
diffracting, with a third diffraction grating, light projected from the fourth lens; and
projecting, with a fifth lens, light diffracted by the third diffraction grating.

17. An imaging system comprising:
a light source, wherein the light source projects a beam of light;
a first diffraction grating, wherein the first diffraction grating projects separated wavelengths of the beam of light projected by the light source;
a first lens, wherein the first lens focuses the separated wavelengths projected by the first diffraction grating;
a reticle, wherein the reticle alters each wavelength focused by the first lens;
a second lens, wherein the second lens collimates the wavelengths altered from the reticle into a collimated beam of light;
a second diffraction grating, wherein the second diffraction grating multiplexes the collimated beam of light projecting from the second lens;
a third lens, wherein the third lens projects the multiplexed collimated beam of light onto an object in an object plane; and
an image sensor, wherein the image sensor receives the light projected onto the object and generates an image of the object.

18. The imaging system of claim 17, wherein the reticle alters a spatial frequency of each wavelength.

19. The imaging system of claim 17, wherein the first lens is a cylindrical lens.

20. The system of claim 17, wherein the reticle is at a focal plane of the first lens.

* * * * *